United States Patent [19]

Taylor et al.

[11] Patent Number: 4,556,613

[45] Date of Patent: Dec. 3, 1985

[54] RESISTANT GLASS IN GLASS-METAL SEAL AND CELL TERMINAL STRUCTURE FOR LITHIUM ELECTROCHEMICAL CELLS

[75] Inventors: Alwyn H. Taylor, Wellesley Hills; Wayne L. Lees, Lexington; Michael L. Cook, Sharon, all of Mass.

[73] Assignee: Duracell Inc., Bethel, Conn.

[21] Appl. No.: 219,412

[22] Filed: Dec. 22, 1980

Related U.S. Application Data

[63] Continuation of Ser. No. 54,493, Jul. 3, 1979, abandoned.

[51] Int. Cl.$^4$ .................................................. H01M 2/08
[52] U.S. Cl. .................................... 429/101; 429/181; 429/185; 174/50.61
[58] Field of Search ............... 429/174, 101, 181, 184, 429/185; 174/50.61

[56] References Cited

U.S. PATENT DOCUMENTS

| | | | |
|---|---|---|---|
| 3,005,865 | 10/1961 | Jonsson | 429/184 |
| 3,006,984 | 10/1961 | Bol et al. | 174/50.61 |
| 3,247,313 | 4/1961 | Dorgelo | 174/50.61 |
| 3,421,945 | 1/1969 | Michalko | 429/174 |
| 4,053,692 | 10/1977 | Dey | 429/174 |
| 4,127,702 | 11/1978 | Catanzarite | 429/181 |
| 4,158,721 | 6/1979 | Decker et al. | 429/174 |
| 4,168,351 | 9/1979 | Taylor | 429/174 |
| 4,186,246 | 1/1980 | Sugalski | 429/181 |

*Primary Examiner*—Donald L. Walton
*Attorney, Agent, or Firm*—Ronald S. Cornell; Israel Nissenbaum

[57] ABSTRACT

A lithium-containing electrochemical cell with a glass-metal seal and cell terminal structure thereon with said glass comprising a glass loaded with alumina or other stable metal oxide or an aluminosilicate glass with or without such alumina or stable metal oxide loading.

11 Claims, No Drawings

RESISTANT GLASS IN GLASS-METAL SEAL AND CELL TERMINAL STRUCTURE FOR LITHIUM ELECTROCHEMICAL CELLS

This is a continuation of application Ser. No. 54,493, filed July 3, 1979, now abandoned.

The present invention relates to glass-metal seal and cell terminal structures for electrochemical cells and particularly to those cells containing lithium anodes and corrosive materials.

In the past, the preferred glasses for the construction of glass-metal seals in electrochemical cells and capacitors requiring stringent hermeticity, such as those described in U.S. Pat. No. 4,053,692 and U.S. Pat. No. 3,646,405 were those referred to as "borosilicate glasses". Such glasses include Corning 7052 and Fusite GC and have the general composition:

| Oxide | Approximate % |
|---|---|
| $SiO_2$ | 70–75 |
| $B_2O_3$ | 20 |
| $Al_2O_3$ | 4–8 |
| $Na_2O$ | 4–7 |
| $K_2O$ | 6 |
| BaO | 0–2 |

Suitable borosilicate glasses have been and are used extensively in the construction of glass-metal seals because of their relatively low working temperatures and the good glass-metal seals made therewith. Accordingly such glasses are utilized in a wide variety of glass-metal seal applications. It has been discovered, however, that though such glass-metal seals are considered adequate in sealing cell containers, in certain instances, particularly when used as cell terminals in cells containing lithium anodes, such glass-metal seals are subject to deterioration with resultant loss of hermeticity and, possibly, electrical insulation, especially under high temperature storage conditions. Such glasses are especially susceptible to deterioration when used in the glass-metal seals of cells containing lithium anodes and, particularly, corrosive fluid depolarizer electrolytes such as thionyl chloride and sulfur dioxide. Glass-metal seals in electrochemical cells have the typical configuration of outer and inner metal members separated by and sealed to the glass therebetween by fusion at the glass-metal interface. Seals of this type are described in greater detail in U.S. Pat. No. 4,053,692 assigned to the same assignee as the present invention. Typically the metal members function as opposing terminals of the cell with electrical connection to the electrodes within the cell. The glass member therebetween thus functions as both an hermetic seal and an electrical insulator.

In lithium cells, the metal member utilized as the conductor from the lithium anode, and the immediately neighboring glass, attract lithium ions from the electrolyte solution. The attracted lithium has been found to enter the neighboring glass, making it an electrical conductor. The conducting glass then becomes part of the anode conductor, which thus extends into the glass, progressively reducing the insulator width. The lithium-permeated glass also occupies greater volume than the initial glass, thereby inducing fracture of the glass and, in some terminal configurations, separation of the glass from the adjoining metal. This mechanical damage degrades the glass-metal seal directly and affects the rate at which insulation is lost through the substitution of conductive glass. As the lithium permeation of the glass increases and spreads across the glass toward the opposite cathode conductor, a conducting bridge across the initially insulating glass may be formed with resultant reduction of cell capacity through self-discharge.

It is an object of the present invention to provide improved glass-metal seals for use in lithium electrochemical cells, with the glass of the seals having improved resistance to deterioration even under abusive conditions.

Generally the present invention comprises an electrochemical cell (particularly one having a lithium anode), having a metal-glass-metal assembly thereon with the metal members of said assembly being terminal conductors for said cell and wherein said glass electrically insulates said metal members from each other and is hermetically sealed to each of said metal members by glass-metal bonds. The glass insulator of the present invention is either a glass loaded with particles of aluminum oxide or alumina ($Al_2O_3$) or other stable metal oxides or an aluminosilicate or similar glass with or without such dispersed particles therein.

Aluminosilicate glasses contain relatively large amounts (about 15%–35% by weight) of dissolved aluminum oxide or alumina ($Al_2O_3$). The alumina within the aluminosilicate glasses comprises part of the molecular structure of the glass, incorporated into and modifying the glassy structure of pure $SiO_2$. Typical aluminosilicate glasses include Corning 1720 and 1723 which have the following general compositions:

|  | 1723 | 1720 |
|---|---|---|
| $SiO_2$ | 57 | 60 |
| $Al_2O_3$ | 15 | 17 |
| $B_2O_3$ | 5 | 5 |
| MgO | 7 | 7–8 |
| CaO | 10 | 7–8 |
| BaO | 6 | — |
| $Na_2O$ | — | 1 |

Aluminosilicate glasses have been found to be more resistant to lithium ion invasion, and therefore provide more stable glass-metal seals, than the borosilicate glasses described above. Aluminosilicate glasses, however, have not been commonly utilized in the construction of glass-metal seals for use in electrochemical cells, in part because of the high temperature (typically about 1200° C.) required in working or softening the glass. The prevailing maximum temperature for equipment used in continuous manufacture of glass-metal seals is about 1100° C. Because of their high softening temperatures, low thermal expansion, and suitability for matched seals to tungsten (W) and molybdenum (Mo), aluminosilicate glasses have been used mainly for high-temperature applications including projection lamps, high-temperature thermometers, combustion tubes and household cooking ware for use directly over flames or other heating units.

Glasses comprising only oxides such as alumina and oxides more stable than alumina (having free energies of formation more negative than about −125 Kcal/gm-atom of oxygen) such as a calcium aluminate glass, and which meet the thermal contraction, working and metal-bonding requirements for glass-to-metal seals generally are similarly expected to resist lithium attack and to serve as durable terminal insulator glasses and are included within the scope of the present invention.

The deterioration resistant characteristics of aluminosilicate and stable oxide glasses may be further enhanced by the mechanical inclusion or loading therein, by mixture therewith, of specific metal oxide additives, particularly aluminum oxide (alumina) in amounts sufficient to inhibit detrimental cracking, typically at least 10% by weight. The inclusion of metal oxides such as alumina in the existing borosilicate glasses used in glass-metal seals has also been found to substantially reduce the deterioration of such glasses in glass-metal seals utilized in lithium cell environments.

The dispersion of hard particles of metal oxides such as alumina within a glass can impede the propagation of cracks through the glass structure. It is postulated that, should included particles more contractile than the glass remain bonded thereto during contraction, compressive stresses within the glass surrounding each particle will oppose the crack-propagating tension at the tip of an approaching crack. Should the glass surrounding the particle separate from the particle during contraction, a cavity is formed therebetween. The resultant cavity serves to stop a spreading crack by redistributing strain in the glass. Metal oxide particles that contract the same as the glass, if weakly bonded to the surrounding glass, will similarly provide such cavity inhibition of crack propagation whereas, if strongly bonded to the glass, they will inhibit crack propagation only if they are more mechanically resistant to cracking than the glass itself.

Metal oxides other than alumina which are suitable for inclusion within the glasses of glass-to-metal seals utilized in lithium electrochemical cells to decrease deterioration thereof, include CaO, BeO, MgO, SrO, BaO, $CeO_2$, $Sc_2O_3$, $Ce_2O_3$, $ZrO_2$, $TiO_2$, $Ti_2O_3$ and the like which have high thermodynamic stability even when utilized in corrosive lithium-cell environments. Suitable metal oxides generally have a more negative free energy of formation than that of alumina (about $-125$ Kcal/gm-atom of oxygen) and therefore are thermodynamically more stable than alumina. For simplicity of manufacturing, it is preferred that the amount of metal oxide inclusions not increase the glass working temperature about 1100° C.

The alumina or other stable particle inclusions are generally effected by mechanically mixing appropriate amounts of dried powdered glass and alumina, pressing the mixture into a friable compact of desired configuration, and heating to coalesce the glass particles by local flow among the still-rigid particles of alumina. It is preferred that, prior to fusion into a terminal assembly, the glass compact be sintered (typically from about 800° C. to 1000° C. for the alumina-aluminosilicate glass and from about 600° C. to 800° C. for the alumina-borosilicate glass) for a short period of time to reduce its porosity and to minimize the flow required for sealing. It is also preferred that after the fusing, the glass mixture be annealed to provide greater mechanical strength for the glass and to relieve stresses in the glass when used in the glass-metal seal. In the formation of the metal-glass-metal seal the glass preform structure is placed between two metal members and heated to a high temperature sufficient to soften the glass, with a metal-glass-metal seal being thereby effected in accordance with known glass-metal seal technology. The temperature used in forming the glass-metal seals is generally dependent upon the amount of undissolved alumina inclusion, with greater percentages of alumina requiring lower glass viscosity and so somewhat higher working temperatures. To facilitate relative motion of the alumina particles when the glass flows, the alumina particles are preferably as free of asperities as is practicable. The preferred particle sizes range in diameter between 1 and 30 microns.

The glass-metal seals of the present invention encompass both matched-expansion seals and compression seals. In a matched-expansion seal the selected aluminosilicate glass or the alumina (or other stable particle) loaded glass is utilized with a pure metal, or alloy of metals, having a substantially similar coefficient of thermal expansion while the glass is rigid. The metal utilized in the matched-expansion seal usually is given, before assembly, a surface coating of its oxide whereby an intimate and hermetic bond between the oxide glass and the metal or metal alloy with its oxide may be effected. Generally an outer compression seal comprises glass surrounded by an outer metal member having a coefficient of expansion sufficiently greater than that of the glass to compress the glass, as cooling continues after the glass becomes rigid, but not large enough to cause inelastic strain or glass cracking. An inner compression seal comprises a less expensive metal surrounded by glass.

The seals of the present invention are particularly useful in cells containing lithium anodes. In addition to lithium, other anode materials for use in non-aqueous electrolyte cells include the alkali and alkaline earth metals, such as sodium, potassium, magnesium and calcium; and aluminum.

Cathodes used in lithium cells include cathode active materials such as silver chromate or carbon fluoride $(CF_x)_n$ or a carbonaceous substrate for soluble active cathode materials such as fluid oxyhalides, non-metallic oxides, or non-metallic halides. Such soluble active cathode materials include sulfur dioxide ($SO_2$) and thionyl chloride ($SOCl_2$) as well as phosphorous oxychloride ($POCl_3$), selenium oxychloride ($SeOCl_2$), sulfur trioxide ($SO_3$), vanadium oxytrichloride ($VOCl_3$), chromylchloride ($CrO_2Cl_2$), sulfuric oxychloride ($SO_2Cl_2$), nitryl chloride ($NO_2Cl$), nitrosyl chloride ($NOCl$), nitrogen dioxide ($NO_2$), sulfur monochloride ($S_2Cl_2$), sulfur monobromide ($S_2Br_2$), and mixtures thereof. Other active cathode materials include $MnO_x$ (with x being approximately 2), $HgCrO_4$, HgO, and generally metal halides, oxides, chromates, and dichromates, permanganates, periodates, molybdates, vanadates, chalcogenides, and mixtures thereof.

Electrolyte solvents used in lithium cells include organic solvents such as tetrahydrofuran, propylene carbonate, dimethyl sulfate, dimethyl sulfoxide, N-nitrosodimethylamine, gamma-butyrolactone, dimethyl carbonate, methyl formate, butyl formate, dimethoxyethane, acetonitrile and N:N dimethyl formamide. Electrolyte salts for such cells include light metal salts such as perchlorates, tetrachloroaluminates, tetrafluoroborates, halides, hexafluorophosphates, hexafluoroarsenates and cloroborates.

Examples of specific metals for use in such seals and which are compatible with various components in cells containing lithium anodes include the following:

In appropriate electrolytes, metals suitable for contact with lithium include copper, iron, steel, stainless steel or all types, nickel, titanium, tantalum, molybdenum, vanadium, niobium, tungsten, and metal alloys such as Kovar, Inconel, and Monel.

Examples of metals and metal alloys which are stable at cathode potential with sulfur dioxide include aluminum, titanium, tantalum, vanadium, tungsten, niobium, and molybdenum.

Examples of metals compatible with silver chromate include titanium, tantalum, molybdenum, vanadium, chromium, tungsten, and stainless steel.

Examples of metals and metal alloys stable at cathode potentials with the highly oxidizing thionyl chloride include titanium, molybdenum, niobium, tantalum, tungsten, Kovar, Inconel, Monel, nickel and stainless steel.

The following examples illustrate seals made in accordance with the present invention which are tested in lithium cell environments whereby their stability may be more clearly seen. All parts are parts by weight unless otherwise indicated. Since the following examples are for illustrative purposes any details disclosed therein should not be considered as limitations on the present invention.

EXAMPLE I

A quantity of Buehler "1 micron" alumina abrasive is heated to transform any remaining alumina hydrate to anhydrous alpha alumina. The dried alumina is mixed with powdered and dried Corning 1723 aluminosilicate glass in sufficient quantity to form a 10% alumina mixture. Washer-shaped pellets, or "preforms", are pressed at 33 Kpsi from the mixture and sintered in air from 850° C. to 1050° C. with temperature increased in progressive 50° C. steps at 10-minute intervals. A metal-to-glass-to-metal terminal is assembled, with the pellet in the annular space between a cold-rolled-steel (low carbon) outer metal member and an inner molybdenum member, which will provide an outer compression and an inner matched seal. The seals are made in an argon atmosphere by fusing for 15 minutes at 1200° C. followed by a 15 minute annealing period at 712° C. The completed terminal thereafter is assembled into a "D" size Li/SO$_2$ cell with its outer metal member connected to the lithium anode. The cell is filled with an electrolyte comprising a ¾ molar solution of lithium bromide in a mixture of 74% by weight sulfur dioxide and 26% by weight acetonitrile, and is stored at 72° C. in a position with the terminal at the bottom. After 6 months there is no leakage of electrolyte or deterioration of the insulation.

EXAMPLE II

A glass-to-metal seal is made in accordance with the procedure of Example I but with the surrounding metal member comprised of molybdenum so that a matched seal results. The seal is thereafter placed in a sealed glass vial containing an electrolyte solution of the above components but with 40% SO$_2$, with the metal member of the seal being lithium polarized. The vials are stored for 5 months at 72° C. At the end of storage only slight corrosion, indicative of only minor attack, is visible. Borosilicate glass seals tested in a similar manner showed extensive corrosion after only 6 weeks of storage.

EXAMPLE III

A Fusite borosilicate glass loaded with 30.8% alumina by weight is bonded in matched glass-to-metal seals with Kovar conductors. The inner metal member or feedthrough is lithium polarized and the seal is exposed to boiling refluxed 1 molar LiAlCl$_4$-thionyl chloride electrolyte solution, for 32 days. Only slight blackening at the inner seal is evident at such time. A seal of similar construction utilizing such Fusite borosilicate glass, but with only 5% alumina load, develops extensive fracture under similar testing.

The preceeding examples were presented for illustrative purposes as demonstrating more clearly the efficacy of the seals of the present invention. It is understood that changes and variations may be made without departing from the scope of the present invention as defined in the following claims.

What is claimed is:

1. A non-aqueous electrochemical cell having an anode comprised of a member of the group consisting of alkali metals, alkaline earth metals and aluminum, said cell being hermetically sealed with a metal-glass-metal seal wherein said glass consists essentially of a member of the group consisting of aluminosilicate glass and glass consisting essentially of alumina and oxides more stable than alumina, wherein said cell contains a lithium anode and wherein said cell contains a cathode depolarizer selected from the group consisting of sulfur dioxide and thionyl chloride.

2. The electrochemical cell of claim 1 wherein said glass in said metal-glass-metal seal contains particles of metal oxides having free energies of formation per gm-atom of oxygen at least as negative as that of alumina.

3. The electrochemical cell of claim 2 wherein said particles are comprised of alumina.

4. The electrochemical cell of claim 3 wherein said alumina particles are substantially free of asperities.

5. The electrochemical cell of claim 4 wherein said particles have diameters ranging between 1 and 30 microns.

6. The electrochemical cell of claim 2 wherein said particles comprise at least 10% by weight of said glass.

7. The electrochemical cell of claim 2 wherein said particles are selected from members of the group consisting of CaO, BeO, MgO, SrO, BaO, Ce$_2$O$_3$, Sc$_2$O$_3$, and ZrO$_2$.

8. The electrochemical cell of claim 2 wherein said metal oxide particle inclusions does not increase the glass working temperature above 1100° C.

9. The electrochemical cell of claim 1 wherein said glass containing alumina and oxides more stable than alumina comprises calcium aluminate.

10. An electrochemical cell comprising a lithium anode and a cathode depolarizer selected from the group consisting of sulfur dioxide and thionyl chloride with said cell being hermetically sealed with a metal-glass-metal seal wherein said glass is comprised of an aluminosilicate glass having included therein at least 10% by weight particles of alumina.

11. An electrochemical cell comprising a lithium anode and a cathode depolarizer selected from the group consisting of sulfur dioxide and thionyl chloride with said cell being hermetically sealed with a metal-glass-metal seal wherein said glass is comprised of a borosilicate glass having included therein at least 10% by weight particles of alumina.

* * * * *